United States Patent
Wang

(10) Patent No.: US 9,455,952 B2
(45) Date of Patent: Sep. 27, 2016

(54) METHOD FOR SETTING FUNCTIONAL MODULE NAME OF MOBILE TERMINAL, AND MOBILE TERMINAL

(71) Applicant: ZTE CORPORATION, Shenzhen, Guangdong Province (CN)

(72) Inventor: Junwei Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/761,949

(22) PCT Filed: Jun. 27, 2013

(86) PCT No.: PCT/CN2013/078171
§ 371 (c)(1),
(2) Date: Jul. 20, 2015

(87) PCT Pub. No.: WO2013/182100
PCT Pub. Date: Dec. 12, 2013

(65) Prior Publication Data
US 2015/0372974 A1    Dec. 24, 2015

(30) Foreign Application Priority Data
Dec. 6, 2012 (CN) .......................... 2012 1 0519812

(51) Int. Cl.
*H01L 29/12* (2006.01)
*H04L 29/12* (2006.01)
*H04M 1/725* (2006.01)
*H04W 8/18* (2009.01)
*H04W 8/22* (2009.01)
*H04W 88/06* (2009.01)

(52) U.S. Cl.
CPC ...... *H04L 61/3015* (2013.01); *H04M 1/72519* (2013.01); *H04M 1/72563* (2013.01); *H04W 8/183* (2013.01); *H04W 8/22* (2013.01); *H04M 1/7253* (2013.01); *H04M 2250/02* (2013.01); *H04M 2250/06* (2013.01); *H04W 88/06* (2013.01)

(58) Field of Classification Search
CPC ............... H04L 61/3015; H04L 41/22; H04L 63/0869; H04L 67/306; H04L 41/0886; H04L 67/3034; H04L 67/303; H04M 1/72519; H04W 88/06; H04W 8/183; H04W 8/22; H04W 76/02; H04W 76/021; H04W 4/005

See application file for complete search history.

(56) References Cited

U.S. PATENT DOCUMENTS

| | | | |
|---|---|---|---|
| 7,801,485 B2 * | 9/2010 | Watanabe et al. ........... | 455/41.2 |
| 8,126,399 B1 * | 2/2012 | Lee .............................. | 455/41.2 |
| 8,626,233 B2 * | 1/2014 | Hossain ............... | H04M 15/00 455/406 |
| 2006/0276133 A1 * | 12/2006 | Ly .......................... | H04W 8/26 455/41.2 |
| 2009/0181653 A1 * | 7/2009 | Alharayeri ............. | H04W 4/02 455/414.1 |
| 2011/0019599 A1 * | 1/2011 | Wood ........................ | G01S 3/04 370/310 |
| 2011/0117849 A1 * | 5/2011 | Inagaki et al. ............... | 455/41.2 |
| 2012/0164947 A1 * | 6/2012 | Kammer et al. ............. | 455/41.2 |
| 2012/0315839 A1 * | 12/2012 | Mumcuoglu et al. ....... | 455/2.01 |
| 2014/0120906 A1 * | 5/2014 | Luo ..................... | H04M 1/7253 455/426.1 |
| 2014/0129652 A1 * | 5/2014 | Chan ..................... | H04L 67/06 709/206 |
| 2015/0373179 A1 * | 12/2015 | Davis ................... | H04W 76/00 455/41.2 |

FOREIGN PATENT DOCUMENTS

| | | |
|---|---|---|
| CN | 102281350 A | 12/2011 |
| CN | 102469453 A | 5/2012 |
| EP | 1838047 A2 | 9/2007 |
| WO | WO2007027660 | 3/2007 |

* cited by examiner

*Primary Examiner* — Hirdepal Singh
(74) *Attorney, Agent, or Firm* — Ling Wu; Stephen Yang; Ling and Yang Intellectual Property

(57) ABSTRACT

The embodiment of the present document discloses a method for setting functional module names of a mobile terminal, which includes: setting the name of a mobile terminal; according to the set name of the mobile terminal, generating functional module names corresponding to functional modules in the mobile terminal. The embodiment of the present document further discloses a mobile terminal. The solution disclosed in the embodiment of the present document can be used to automatically modify the names of various functional modules in a mobile terminal by setting the name of the mobile terminal, thus reducing the user's operation steps and also improving the user experience.

8 Claims, 10 Drawing Sheets

METHOD FOR SETTING FUNCTIONAL MODULE NAME OF MOBILE TERMINAL, AND MOBILE TERMINAL

TECHNICAL FIELD

The present document relates to the field of mobile communication technologies, and more particularly, to a method for setting functional module names of a mobile terminal and the mobile terminal.

BACKGROUND OF THE RELATED ART

Currently, technologies such as Bluetooth, portable wireless fidelity (WIFI) hot spots, WIFI Direct have been more widely used in high-end mobile terminals, and the Bluetooth and the portable WIFI hotspot have already been common features. Through the Bluetooth, users can easily exchange and share information with various types of equipment; through the portable WIFI hotspot, users can share the mobile network of the mobile terminal with other equipment, and through the WIFI Direct, the users can conveniently achieve directly connecting, transferring data, or sharing applications with other equipment.

However, because currently the mobile terminals usually identify Bluetooth devices with default device names, and use a default value or a random value to identify WIFI hot spots and WIFI Direct devices, and no matter whether to uniformly use an identification or randomly generate an identification, it causes disorder for the user to distinguish, because when a user uses the abovementioned function, usually the user is just for one person, and then connects to his device, but rarely knows what the device name of the other party is. In order to identify the user's device, the current practice is that, in modules such as Bluetooth, portable WIFI hotspot, WIFI Direct, the user can individually modify the name of each module. However, the operation of this method has some complexity and limitations.

SUMMARY OF THE INVENTION

The embodiment of the present document provides a method for setting functional module names of a mobile terminal and the mobile terminal, and it is designed to automatically modify the names of various functional modules in a mobile terminal to reduce the user's operation steps and enhance the user experience.

The present document provides a method for setting functional module names of a mobile terminal, comprising:

setting the name of a mobile terminal;

according to the set name of the mobile terminal, generating functional module names corresponding to functional modules in the mobile terminal.

Preferably, after executing said generating the functional module names corresponding to the functional modules in the mobile terminal, it further comprises:

displaying the functional module names.

Preferably, after executing said displaying the functional module names, it further comprises:

prompting a user to confirm the functional module names.

Preferably, after executing said prompting the user to confirm the functional module names, it further comprises:

according to the current states of the functional modules, saving the functional module names; the current states of the functional modules comprise non-startup state, turned-off state and turned-on state.

Preferably, said saving the functional module names according to the current states of the functional modules comprises:

when the current state of the functional module is the non-startup state, saving the functional module name corresponding to the functional module into a database;

when the current state of the functional module is the turned-off state, saving the functional module name corresponding to the functional module into a configuration file of the functional module;

when the current state of the functional module is the turned-on state, replacing and saving the functional module name corresponding to the functional module into the configuration file of the functional module.

Preferably, before executing said generating functional module names corresponding to various functional modules in the mobile terminal in accordance with the set name of the mobile terminal, it further comprises:

judging the condition of the mobile terminal supporting the functional modules; the functional modules at least comprise a Bluetooth module, a WIFI hotspot module and a WIFI Direct module.

The embodiment of the present document further provides a mobile terminal, comprising:

a setting module, configured to: set the name of a mobile terminal;

a name generating module, configured to: according to the set name of the mobile terminal, generate functional module names corresponding to functional modules in the mobile terminal.

Preferably, the mobile terminal further comprises:

a displaying module, which is configured to: display the functional module names.

Preferably, the mobile terminal further comprises:

a prompting module, configured to: prompt a user to confirm the functional module names.

Preferably, the mobile terminal further comprises:

a saving module, which is configured to: according to the current states of the functional modules, save the functional module names; the current states of the functional modules comprise a non-startup state, a turned-off state and a turned-on state.

Preferably, the saving module is configured to:

when the current state of the functional module is the non-startup state, save the functional module name corresponding to the functional module into a database;

when the current state of the functional module is the turned-off state, save the functional module name corresponding to the functional module into a configuration file of the functional module;

when the current state of the functional module is the turned-on state, replace and save the functional module name corresponding to the functional module into the configuration file of the functional module.

Preferably, the mobile terminal further comprises:

a judging module, configured to: judge the condition of the mobile terminal supporting the functional modules; the functional modules at least comprise a Bluetooth module, a WIFI hotspot module and a WIFI Direct module.

In the embodiment of the present document, it sets the name of a mobile terminal and then generates functional module names corresponding to functional modules in the mobile terminal according to the set name of the mobile terminal. By setting the name of the mobile terminal, the names of various functional modules in the mobile terminal can be automatically modified, thus reducing the user's operation steps and improving the user experience.

Object implementations, functions and features and advantages of the present document will be further described in conjunction with the embodiments and with reference to the accompanying drawings.

PREFERRED EMBODIMENTS OF THE INVENTION

It should be understood that the specific embodiments described herein are only for explaining the present document and are not intended to limit the present document. In the case of no conflict, embodiments and features in the embodiments of the present application can be combined with each other.

The embodiment of the present document provides a method for setting functional module names of a mobile terminal, which automatically generates corresponding functional module names for various functional modules supported by the mobile terminal by setting the name of the mobile terminal, and displays the functional module names to the user for the user to confirm whether to save the names or not, and the user can also modify the functional module names by himself/herself.

Figure 1:
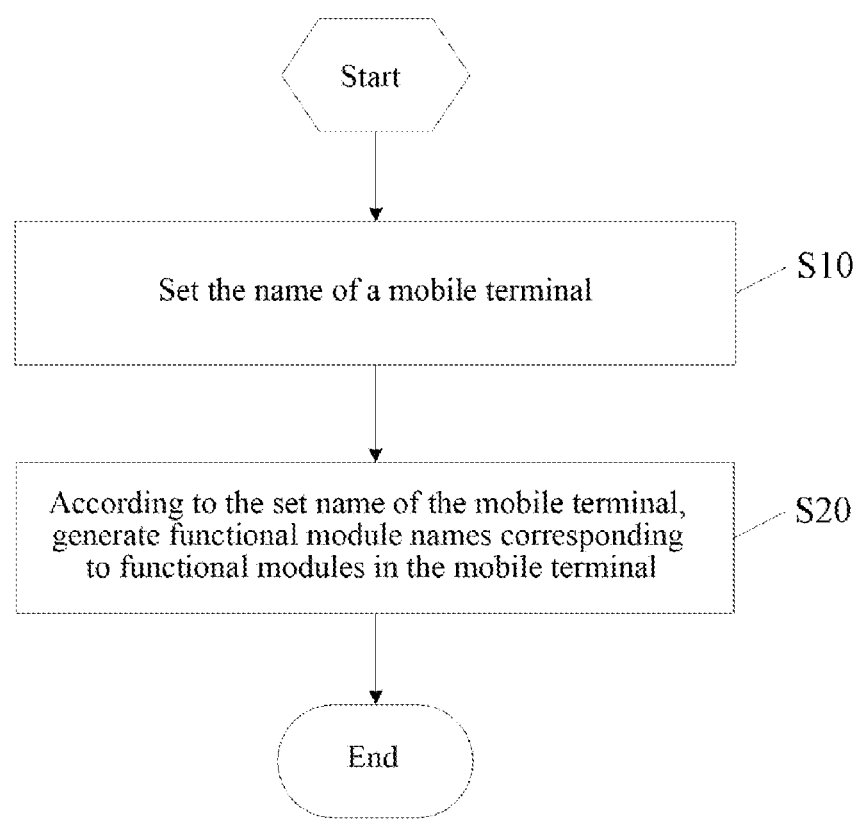
FIG. 1 is a flow chart of a first embodiment of the method for setting functional module names of a mobile terminal in accordance with the present document.

Referring to FIG. 1 FIG. 1 is a flow chart of a first embodiment of the method for setting functional module names of a mobile terminal in accordance with the present document.

The method for setting functional module names of a mobile terminal provided in the present embodiment comprises:

in step S10, it is to set the name of a mobile terminal;

In the present embodiment, an entry can be added in the setting module of the mobile terminal for a user to enter the name of the mobile terminal, and the user can set the name of the mobile terminal through the entry. Before setting the functional module names corresponding to various functional modules in the mobile terminal, the name of the mobile terminal is first set. The name of the mobile terminal can be set by the user by himself/herself, which can play a role of identifying the user's mobile terminal device, and in the present embodiment, in order to ensure that it has a different name from the ones that other surrounding mobile terminals have, preferably the user's full name is used as the name of mobile terminal.

In step S20, according to the set name of the mobile terminal, it is to generate a functional module name corresponding to the functional module in the mobile terminal;

after the name of the mobile terminal is set, functional module names corresponding to various functional modules are automatically generated according to the functional modules supported by the mobile terminal as well as the name of the mobile terminal. In the present embodiment, a functional module name can be the set name of the mobile terminal plus the function name of the functional module.

In the embodiment of the present document, it sets the name of a mobile terminal and then generates functional module names corresponding to functional modules in the mobile terminal according to the set name of the mobile terminal. By setting the name of the mobile terminal, the names of various functional modules in the mobile terminal can be automatically modified, thus reducing the user's operation steps and improving the user experience.

Figure 2:
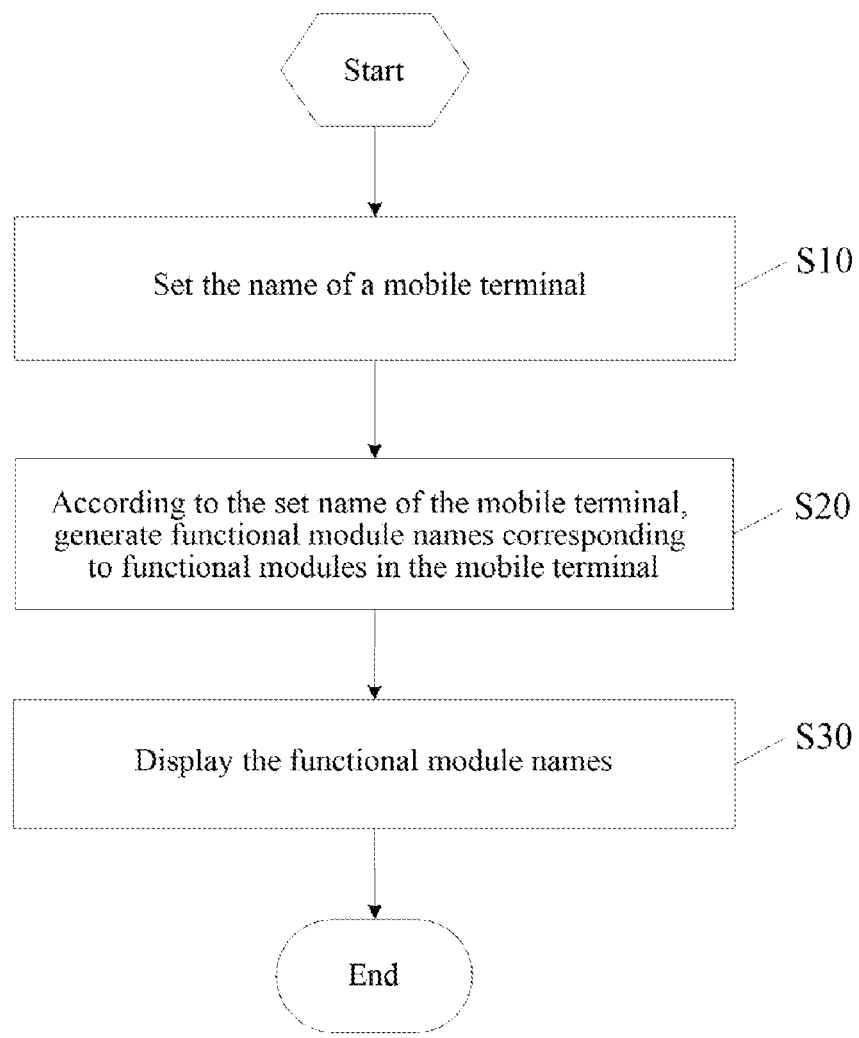
FIG. 2 is a flow chart of a second embodiment of the method for setting functional module names of a mobile terminal in accordance with the present document.

Refer to FIG. 2, and FIG. 2 is a flow chart of a second embodiment of the method for setting functional module names of a mobile terminal in accordance with the present document.

Based on the abovementioned embodiment, after executing the step S20, the method further comprises:

in step S30, it is to display the functional module names.

After functional module names corresponding to various functional modules are automatically generated according to the name of the mobile terminal, the generated functional module names are displayed to the user through an interface, and in the present embodiment, the respective functional modules and the corresponding functional module names can be listed in the interface of the mobile terminal.

After functional module names corresponding to various functional modules are automatically generated according to the set name of the mobile terminal, the generated functional module names are displayed to the user, so as to provide a foundation for the user to confirm the functional module names.

Figure 3:
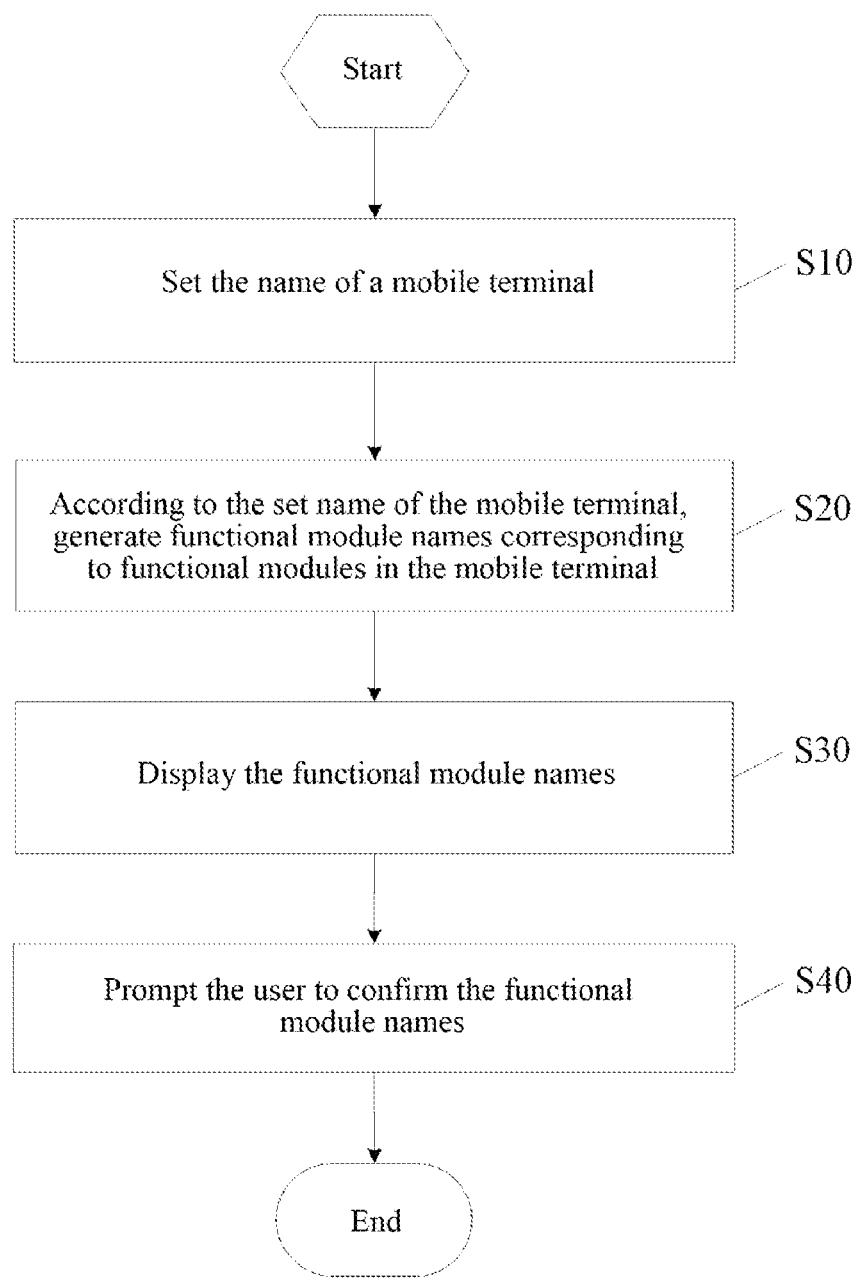
FIG. 3 is a flow chart of a third embodiment of the method for setting functional module names of a mobile terminal in accordance with the present document.

Refer to FIG. 3, and FIG. 3 is a flow chart of a third embodiment of the method for setting functional module names of a mobile terminal in accordance with the present document.

Based on the abovementioned embodiment, after performing the step S30, the method further comprises:

in step S40, it is to prompt the user to confirm the functional module names.

The generated functional module names are displayed in the interface of the mobile terminal, meanwhile, a confirmation button is set for the user to confirm the functional module names corresponding to various functional modules, prompting the user to perform confirming. In this case, if the user accepts the automatically generated functional module names, then the user clicks the confirmation; and if the user does not accept them, then the user can make modifications by himself/herself and click the confirmation after modifications, thus completing the setting of names of functional modules of the mobile terminal.

The generated functional module names are displayed, and the user is prompted to confirm the functional module names displayed in the interface, thus ensuring that the names of various functional modules of the mobile terminal can be automatically modified by setting the name of the mobile terminal.

Figure 4:
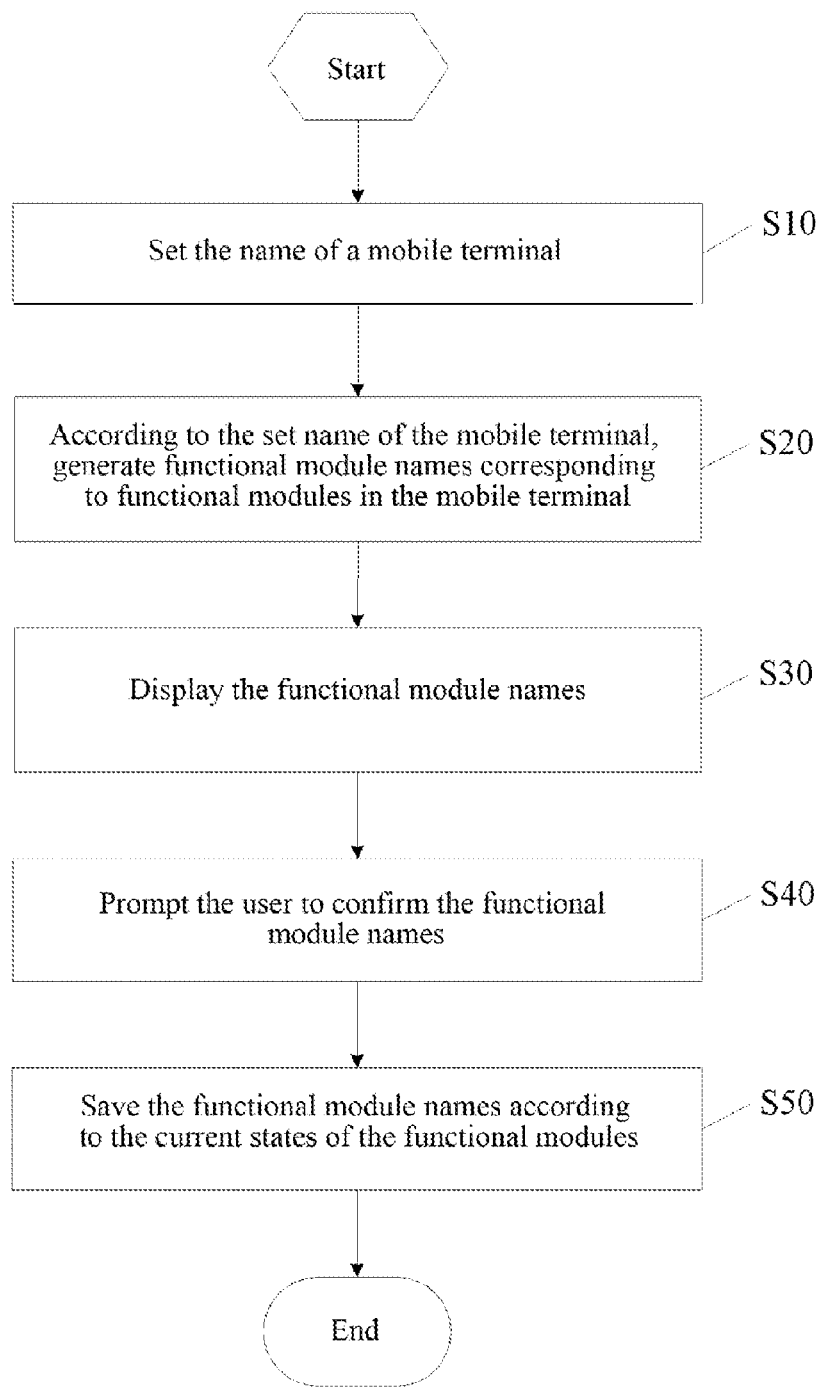
FIG. 4 is a flow chart of a fourth embodiment of the method for setting functional module names of a mobile terminal in accordance with the present document.

Refer to FIG. 4, and FIG. 4 is a flow chart of a fourth embodiment of the method for setting functional module names of a mobile terminal in accordance with the present document.

Based on the abovementioned embodiment, after performing the step S40, the method further comprises:

in step S50, it is to save the functional module names according to the current states of the functional modules; the current states of the functional modules comprise the non-startup state, the turned-off state and the turned-on state.

After the user accepts the displayed and automatically generated functional module names and clicks the confirmation, or after the user modifies the functional module names by himself/herself and clicks the confirmation, at this time, it is to judge the current states of the functional modules, and according to the difference of the current states, perform different savings on the functional module names. In this embodiment, the current states of the functional modules comprise the non-startup state, the turned-off state and the turned-on state, wherein the non-startup state refers to that the functional module of the mobile terminal has never been started up in these circumstances that it was out of the factory, or restored with the factory settings, or upgraded; the turned-off state refers to that the functional module was started up but it is currently in the turned-off state; and the turned-on state refers to that the functional module is currently in the turned-on state.

After the user confirms the automatically generated functional module names or the user modifies the functional module names by himself/herself, according to the current states of the functional modules, the functional module names are saved, to facilitate finding and using the functional module names when starting up the functional modules next time, which provides a premise guarantee for reducing the user's operation steps.

Figure 5:
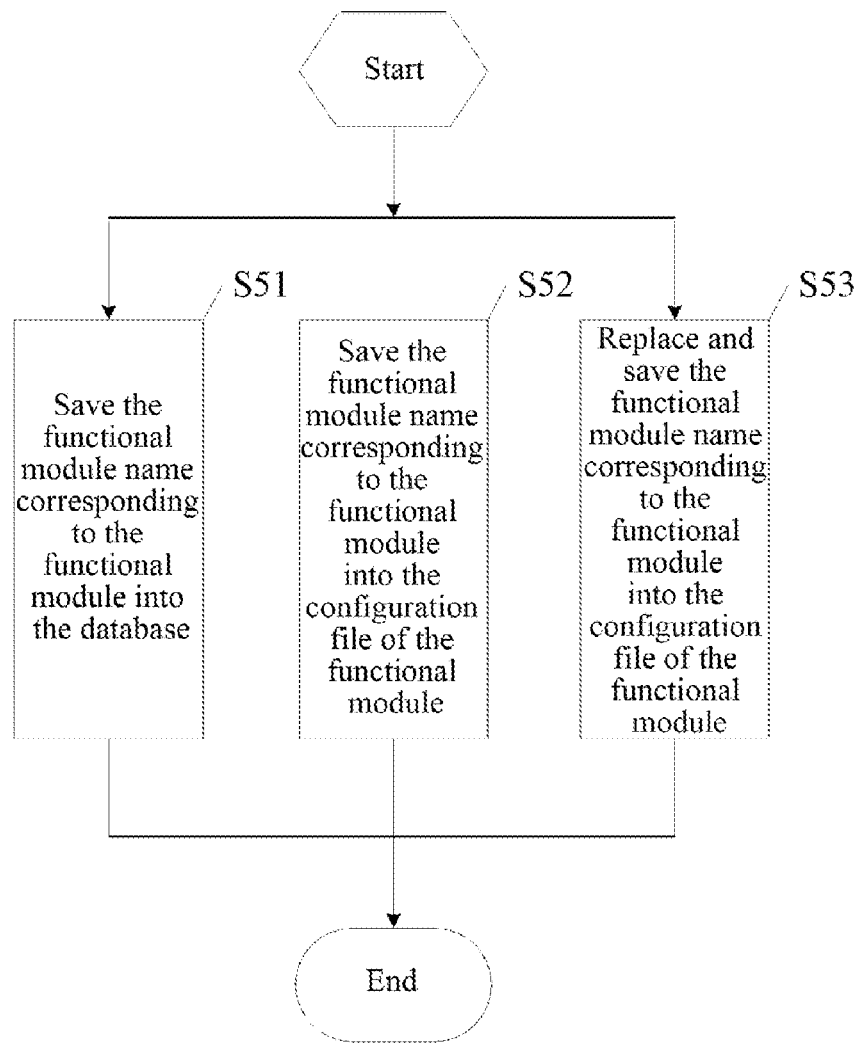
FIG. 5 is a flow chart of saving the functional module names in the method for setting functional module names of a mobile terminal in accordance with the present document.

Refer to FIG. 5, and FIG. 5 is a flow chart of saving the functional module names in the method for setting functional module names of a mobile terminal in accordance with the present document.

Based on the abovementioned embodiment, in step S50, when the current state of a functional module is the non-startup state, proceed to step S51; when the current state of a functional module is the turned-off state, proceed to step S52; when the current state of a functional module is the turned-on state, proceed to step S53.

In step S51, it is to save the functional module name corresponding to the functional module into the database;

when determining that the current state of a functional module is the non-startup state, it indicates that the configuration file, which is used to store the functional module name, of the functional module has not been generated, then the functional module name is stored in the database of the mobile terminal. In this embodiment, a record is generated according to the functional module name, and the record takes the functional module as the key and the functional module name as the value, and the record is saved in the database. After the functional module is started up, the database is searched to judge whether there is a record which takes the functional module as the key and the functional module name as the value therein, and if yes, the functional module name in the record is displayed and written into the configuration file of the functional module, then the value is cleared, and when the functional module is turned on next time, the value in the database will not be used again, but the configuration file is directly searched and the value therein is used.

In step S52, it is to save the functional module name corresponding to a functional module into the configuration file of the functional module;

when determining that the current state of a functional module is the turned-off state, it indicates that the configuration file, which is used to store the functional module name, of the functional module has been generated, and at this time, it is to directly save the functional module name into the configuration file.

In step S53, it is to replace and save the functional module name corresponding to the functional module into the configuration file of the functional module.

When determining that the current state of a functional module is the turned-on state, because various functional modules in the mobile terminal have corresponding processing procedures of changing names, when the current state of a functional module is the turned-on state, it is to first trigger the processing procedure of changing names of the functional module, and replace the name previously stored in the configuration file with the currently generated functional module name and save the currently generated functional module name in the configuration file.

When the current state of a functional module is the non-startup state, the turned-off state or the turned-on state, it is to respectively save the functional module name corresponding to the functional module into the database, or into the configuration file, or replace and save it into the configuration file, which ensures to reduce the user's operation steps and enhance the user experience.

Figure 6:
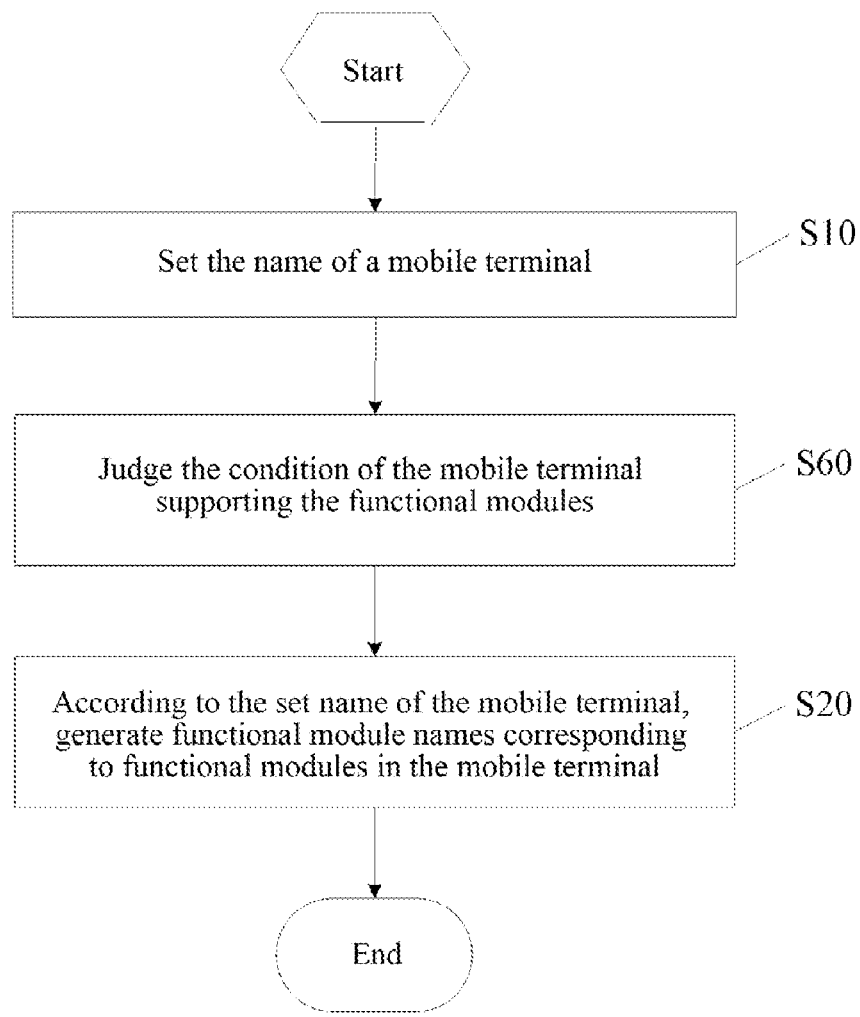
FIG. 6 is a flow chart of a fifth embodiment of the method for setting the functional module names of a mobile terminal in accordance with the present document.

Refer to FIG. 6, and FIG. 6 is a flow chart of a fifth embodiment of the method for setting functional module names of a mobile terminal in accordance with the present document.

Based on the first embodiment of the method for setting the functional module name of a mobile terminal in the present document, before performing the step S20, it further comprises:

in step S60, it is to judge the condition of the mobile terminal supporting the functional modules; and the functional modules comprise at least a Bluetooth module, a WIFI hotspot module and a WIFI Direct module.

Before generating functional module names corresponding to the functional modules according to the set name of the mobile terminal, it is to first judge the functional modules supported by the mobile terminal, that is, judge which functional modules are supported by the mobile terminal. In this embodiment, the functional modules comprise a Bluetooth module, a WIFI hotspot module, a WIFI Direct module and other modules, and when the mobile terminal communicates with other mobile terminals through these modules, it needs to provide a name which can be identified by the other party.

After setting the name of mobile terminal, it needs to, before generating functional module names corresponding to various functional modules of the mobile terminal according to the name, first judge which functional modules are supported by the mobile terminal, so as to generate functional module names of these functional modules, thus providing the foundation for automatically modifying the names of various functional modules of the mobile terminal according to the name of the mobile terminal.

Figure 7:
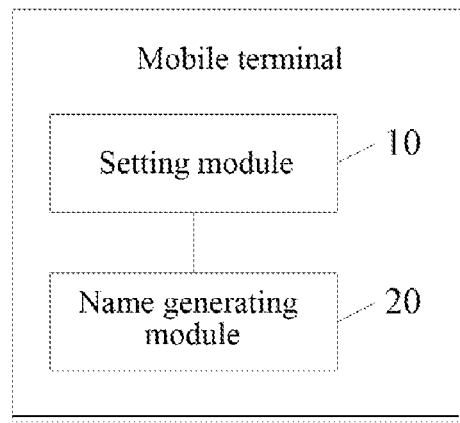
FIG. 7 is a schematic diagram of the structure of a first embodiment of a mobile terminal in accordance with the present document.

Refer to FIG. 7, and FIG. 7 is a schematic diagram of the structure of a first embodiment of the mobile terminal in accordance with the present document.

The mobile terminal provided in the present embodiment comprises:

a setting module 10, which is configured to: set the name of the mobile terminal;

a name generating module 20, configured to: according to the set name of the mobile terminal, generate functional module names corresponding to the functional modules in the mobile terminal;

In the present embodiment, an entry can be added in the setting module of the mobile terminal for the user to enter the name of the mobile terminal, and the user can set the name of the mobile terminal through the entry. Before setting functional module names corresponding to various functional modules in the mobile terminal, the name of the mobile terminal is firstly set through the setting module 10. The name of the mobile terminal is set by the user by himself/herself, which can play a role of identifying the user's mobile terminal device, and in this embodiment, in order to ensure that the name is different from the ones that other surrounding mobile terminals have, preferably the user's full name is used as the name of the mobile terminal.

After setting the name of the mobile terminal, the name generating module 20 automatically generates functional module names corresponding to various functional modules according to the functional modules supported by the mobile terminal as well as the name of the mobile terminal. In the present embodiment, a functional module name can be set as the name of the mobile terminal plus the function name of the functional module.

In the embodiment of the present document, it sets the name of a mobile terminal and then generates functional module names corresponding to functional modules in the mobile terminal according to the set name of the mobile terminal. By setting the name of the mobile terminal, the names of various functional modules in the mobile terminal can be automatically modified, thus reducing the user's operation steps and improving the user experience.

Figure 8:
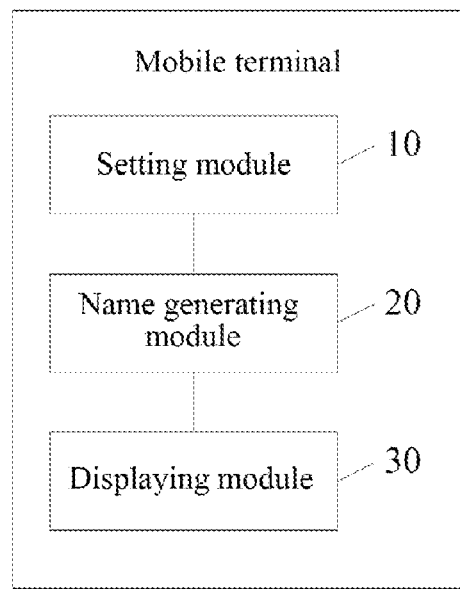
FIG. 8 is a schematic diagram of the structure of a second embodiment of the mobile terminal in accordance with the present document.

Refer to FIG. 8, and FIG. 8 is a schematic diagram of the structure of a second embodiment of the mobile terminal in accordance with the present document.

Based on the abovementioned embodiment, the mobile terminal further comprises:

a displaying module 30, configured to: display the functional module names.

After functional module names corresponding to various functional modules according to the name of the mobile terminal are automatically generated, the displaying module 30 displays the generated functional module names to the user through the interface, and in this embodiment, various functional modules and the corresponding functional module names may be listed in the interface of the mobile terminal.

After the functional module names corresponding to various functional modules according to the set name of the mobile terminal are automatically generated, the generated functional module names are displayed to the user, so as to provide the foundation for the user to confirm the functional module names.

Figure 9:
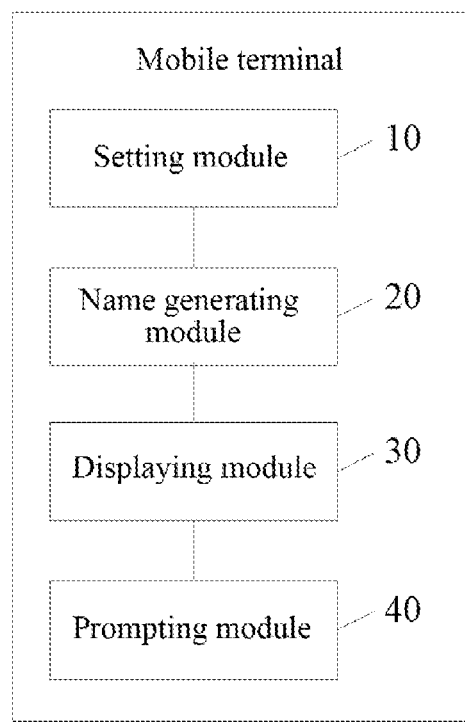
FIG. 9 is a schematic diagram of the structure of a third embodiment of the mobile terminal in accordance with the present document.

Refer to FIG. 9, and FIG. 9 is a schematic diagram of the structure of a third embodiment of the mobile terminal in accordance with the present document.

Based on the abovementioned embodiment, the mobile terminal further comprises:

a prompting module 40, configured to: prompt the user to confirm the functional module names.

the generated functional module names are displayed in the interface of the mobile terminal, meanwhile the prompting module 40 is provided with a confirmation button for the user to confirm the functional module names corresponding to various functional modules, prompting the user to perform confirming. In this case, if the user accepts the automatically generated functional module names, then the user clicks the confirmation; and if the user does not accept the names, the user can make modifications by himself/herself and then click the confirmation after the modification, so as to complete the setting of names of the functional modules of the mobile terminal.

Displaying the generated functional module names and prompting the user to confirm the functional module names displayed in the interface can further ensure that the names of various functional modules of the mobile terminal can be automatically modified by setting the name of the mobile terminal.

Figure 10:
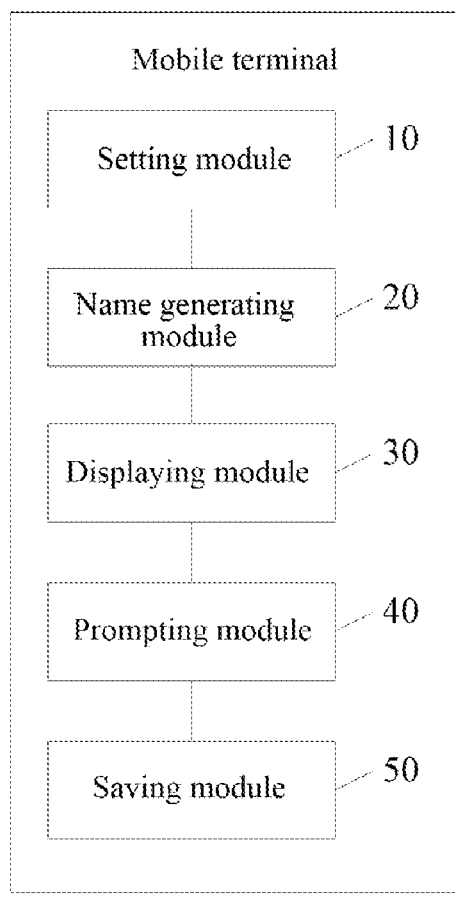
FIG. 10 is a schematic diagram of the structure of a fourth embodiment of the mobile terminal in accordance with the present document.

Refer to FIG. 10, and FIG. 10 is a schematic diagram of the structure of a fourth embodiment of the mobile terminal in accordance with the present document.

Based on the abovementioned embodiment, the mobile terminal further comprises:

a saving module 50, which is configured to: according to the current states of the functional modules, save the functional module names; the current states of the functional modules comprise the non-startup state, the turned-off state and the turned-on state.

After the user accepts the displayed and automatically generated functional module names and clicks the confirmation, or after the user modifies the functional module names by himself/herself and clicks the confirmation, at this time, the saving module 50 judges the current states of the functional modules, and perform different savings on the functional module names according to the difference of the current states. In this embodiment, the current states of the functional modules comprise the non-startup state, the turned-off state and the turned-on state, wherein the non-startup state refers to that the functional module of the mobile terminal has never been started up in these circumstances that it was out of the factory, or restored with the factory settings, or upgraded; the turned-off state refers to that the functional module was started up but it is currently in the turned-off state; and the turned-on state refers to that the functional module is currently in the turned-on state.

After the user confirms the automatically generated functional module names, or the user modifies the functional module names by himself/herself, the functional module names are saved according to the current states of the functional modules, so as to facilitate finding and using the functional module names when starting up the functional modules next time, which provides a premise guarantee for reducing the user's operation steps.

In the abovementioned embodiment, the saving module 50 is configured to:

when the current state of a functional module is the non-startup state, save the functional module name corresponding to the functional module into a database;

when the current state of a functional module is the turned-off state, save the functional module name corresponding to the functional module into a configuration file of the functional module;

when the current state of a functional module is the turned-on state, replace and save the functional module name corresponding to the functional module into the configuration file of the functional module.

when determining that the current state of a functional module is the non-startup state, it indicates that the configuration file, which is used to store the functional module name, of the functional module has not been generated, at this time, the functional module name is stored in the database of the mobile terminal. In this embodiment, a record is generated according to the functional module name, and the record takes the functional module as the key and the functional module name as the value, and the record is saved in the database. When the functional module is started up, it is to search in the database to judge whether there is a record which takes the functional module as the key and the functional module name as the value therein, and if yes, display the functional module name in the record and write it into the configuration file of the functional module, and then clear the value, and when the functional module is started up next time, the value in the database will not be used again, and the configuration file is directly searched and the value therein is used.

When determining that the current state of a functional module is the turned-off state, it indicates that the configuration file, which is used to store the functional module name, of the functional module has been generated, at this time, it is to directly save the functional module name in the configuration file.

When determining that the current state of a functional module is the turned-on state, because various functional module in the mobile terminal has corresponding processing procedures of changing names, when the current state of the functional module is the turned-on state, it is to first trigger the processing procedures of changing names of the functional module, and replace the name previously stored in the configuration file with the currently generated functional module name and save the currently generated functional module name in the configuration file.

When the current state of the functional module is the non-startup state, the turned-off state or the turned-on state, it is to respectively save the functional module name corresponding to the functional module into the database, or into the configuration file, or replace and save it in the configuration file, which ensures to reduce the user's operation steps and enhance the user experience.

Figure 11:
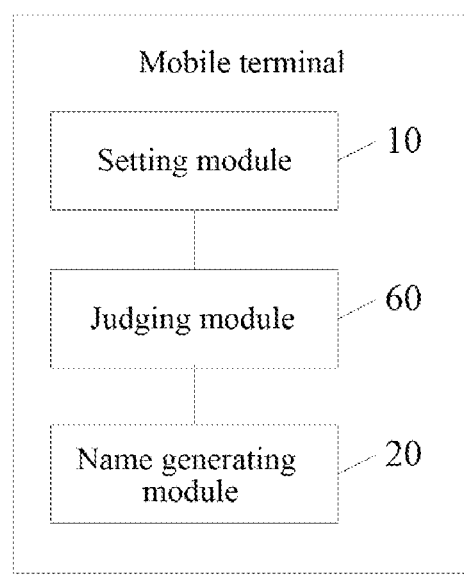
FIG. 11 is a schematic diagram of the structure of a fifth embodiment of the mobile terminal in accordance with the present document.

Refer to FIG. 11, and FIG. 11 is a schematic diagram of the structure of a fifth embodiment of the mobile terminal in accordance with the present document.

Based on the abovementioned embodiment, the mobile terminal further comprises:

a judging module 60, configured to: judge the condition of the mobile terminal supporting the mobile modules; the functional modules at least comprise a Bluetooth module, a WIFI hotspot module and a WIFI Direct module.

Before generating a functional module name corresponding to a functional module according to the set name of the mobile terminal, the functional modules supported by the mobile terminal are firstly judged through the judging module 40, that is, it judges which functional modules are supported by the mobile terminal. In this embodiment, the functional modules comprise a Bluetooth module, a WIFI hotspot module, a WIFI Direct module and other modules, and when the mobile terminal communicates with other mobile terminals through these modules, it needs to provide a name which can be identified by the other party.

After setting the name of mobile terminal, it needs to, before generating functional module names corresponding to various functional modules of the mobile terminal according to the name, first judge which functional modules are supported by the mobile terminal, so as to generate functional module names of these functional modules, thus providing the foundation for automatically modifying the names of various functional modules of the mobile terminal according to the name of the mobile terminal.

In another embodiment, it further provides a kind of software which is used to perform the technical solution described in the abovementioned embodiments and the preferred embodiments.

In another embodiment, it further provides a storage medium, and the storage medium stores the above software, and the storage medium includes, but is not limited to: compact disc, floppy disk, hard disk, flash memory or the like.

Obviously, a person skilled in the art should understand that the respective modules or steps in the embodiments of the present document can be implemented with general-purpose computing devices, and they can be concentrated in a single computing device or distributed in a network consisting of multiple computing devices, alternatively, they may be executed by program codes executable by computing means, so that they can be stored in storage means and executed by computing means, and in some conditions, the illustrated or described steps are executed in an order different from the one herein, or they can be respectively made into individual integrated circuit modules, or some of the modules or steps therein can be made into a single integrated circuit module for implementation. Therefore, the present document is not limited to any specific hardware and software combination.

The above description is only preferred embodiments of the present document, and it is not used to limit the patent scope of the present document, and any equivalent structures or equivalent process transformations made by using the specification and the accompanying figures of the present document, either directly or indirectly applied in other relevant technologies, should be included in the patent protection scope of the present document.

INDUSTRIAL APPLICABILITY

In the embodiment of the present document, it automatically modifies the names of various functional modules of a mobile terminal by setting the name of the mobile terminal, thus reducing the user's operation steps and improving the user experience.

What is claimed is:

1. A method for setting functional module names of a mobile terminal, the method comprising:
    setting a name of the mobile terminal;
    according to the name of the mobile terminal, generating functional module names corresponding to various functional modules in the mobile terminal;
    displaying the functional module names;
    prompting a user to confirm the functional module names; and
    according to a current state of each functional module, saving the corresponding functional module name of each functional module, wherein the current state comprises a non-startup state, a turned-off state and a turned-on state.

2. The method of claim 1, wherein said according to a current state of each functional module, saving the corresponding functional module name of each functional module comprises:

when the current state of the functional module is the non-startup state, saving the functional module name corresponding to the functional module into a database;

when the current state of the functional module is the turned-off state, saving the functional module name corresponding to the functional module into a configuration file of the functional module;

when the current state of the functional module is the turned-on state, replacing and saving the functional module name corresponding to the functional module into the configuration file of the functional module.

3. The method of claim 1, wherein before executing said generating functional module names corresponding to various functional modules in the mobile terminal according to the set name of the mobile terminal, the method further comprises:

judging a condition of the mobile terminal supporting the functional modules; wherein the functional modules at least comprise a Bluetooth module, a WIFI hotspot module and a WIFI Direct module.

4. The method of claim 2, wherein before executing said generating functional module names corresponding to various functional modules in the mobile terminal according to the set name of the mobile terminal, the method further comprises:

judging a condition of the mobile terminal supporting the functional modules; wherein the functional modules at least comprise a Bluetooth module, a WIFI hotspot module and a WIFI Direct module.

5. A mobile terminal, comprising a processor and a storage device, wherein the storage device stores processor-executable programs with following modules:

a setting module, configured to: set a name of a mobile terminal; and a name generating module, configured to: according to the name of the mobile terminal, generate functional module names corresponding to various functional modules in the mobile terminal;

a displaying module, configured to: display the functional module names;

a prompting module, configured to: prompt a user to confirm the functional module names; and a saving module, configured to: according to a current state of each functional module, save the corresponding functional module name of each functional module, wherein the current state comprises a non-startup state, a turned-off state and a turned-on state.

6. The mobile terminal of claim 5, wherein the saving module is configured to:

when the current state of the functional module is the non-startup state, save the functional module name corresponding to the functional module into a database;

when the current state of the functional module is the turned-off state, save the functional module name corresponding to the functional module into a configuration file of the functional module;

when the current state of the functional module is the turned-on state, replace and save the functional module name corresponding to the functional module into the configuration file of the functional module.

7. The mobile terminal of claim 5, further comprising:

a judging module, configured to: judge a condition of the mobile terminal supporting the functional modules; wherein the functional modules at least comprise a Bluetooth module, a WIFI hotspot module and a WIFI Direct module.

8. The mobile terminal of claim 6, further comprising:

a judging module, configured to: judge a condition of the mobile terminal supporting the functional modules; wherein the functional modules at least comprise a Bluetooth module, a WIFI hotspot module and a WIFI Direct module.

* * * * *